Oct. 24, 1967 C. H. JACOBY ETAL 3,348,883
METHOD FOR CONCOMITANT MINING AND BENEFICIATION
OF SOLUBLE MINERAL
Filed Dec. 27, 1965
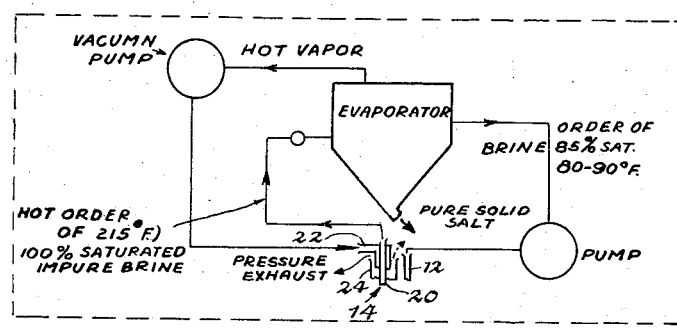
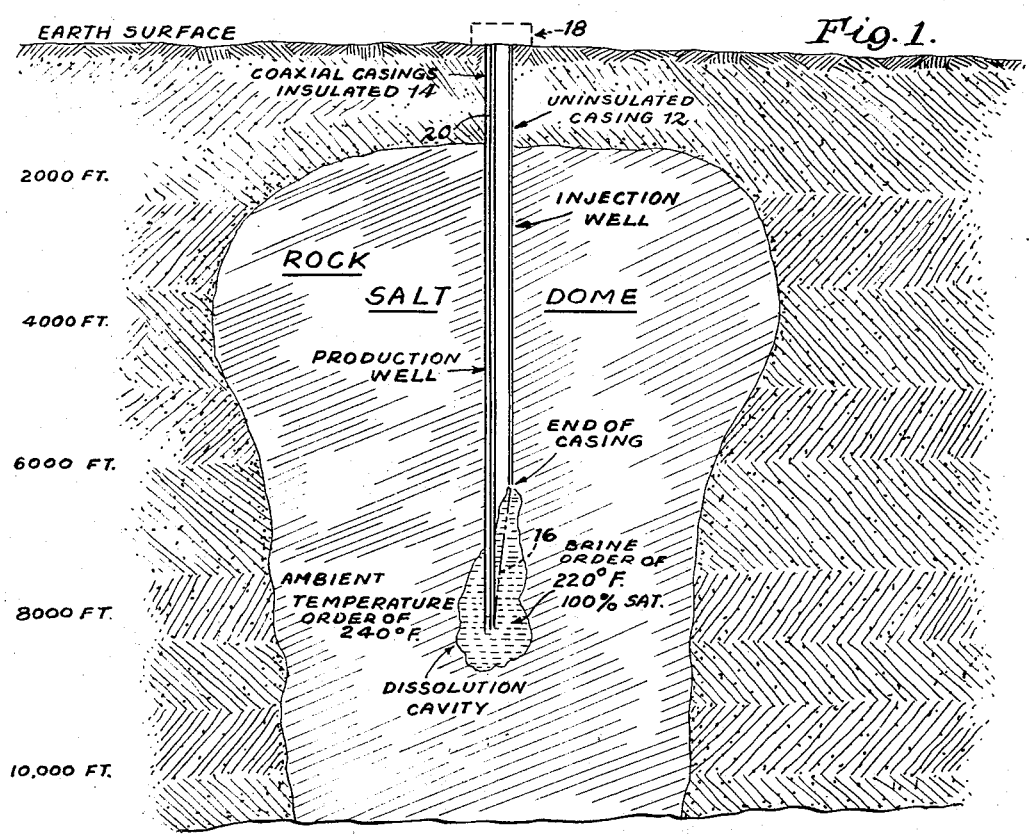
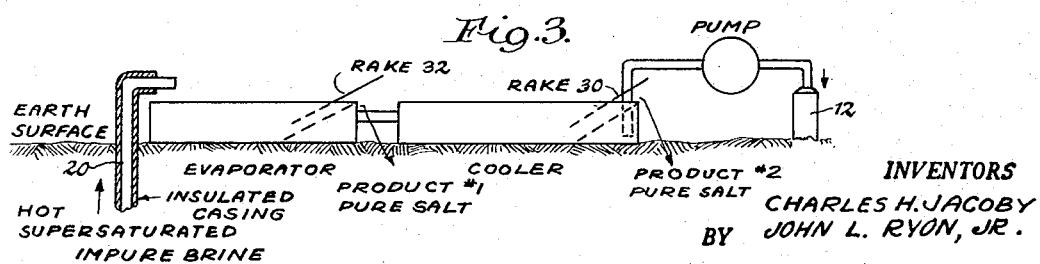
INVENTORS
CHARLES H. JACOBY
JOHN L. RYON, JR.
BY
ATTORNEYS

United States Patent Office 3,348,883
Patented Oct. 24, 1967

3,348,883
METHOD FOR CONCOMITANT MINING AND BENEFICIATION OF SOLUBLE MINERAL
Charles H. Jacoby, Grosse Ile, Mich., and John L. Ryon, Jr., Clarks Green, Pa., assignors to International Salt Company, Clarks Summit, Pa.
Filed Dec. 27, 1965, Ser. No. 516,621
8 Claims. (Cl. 299—4)

This invention relates to the mining and refining or "beneficiation" of soluble minerals; and more particularly to the mining and beneficiation of sodium chloride or other soluble mineral salts or like substances, the solubilities of which vary with temperature changes.

Whereas various processes and means have been heretofore developed and employed for the purification of previously mined salts or the like, it is the primary object of the present invention to provide an improved process and means for refining or "purifying" mineral salts as aforesaid concomitant to the mining thereof. For example, U.S. Patents Nos. 2,555,340 and 2,876,182 disclose practicable processes and apparati for refining sodium chloride and similar salts, but only after the raw salt materials have been mined and conveyed to the purification facility. Briefly stated, such prior processes involve taking the raw impure or run-of-mine salt into solution while heating the brine and thus making a supersaturated salt solution; and then subjecting the solution to evaporating and cooling processes whereby recrystallized, purified, sodium chloride is obtained.

More specifically, as explained in the aforesaid patents, salt such as mined rock salt, usually consists of sodium chloride to the extent of about 90% to 98%; the balance being impurities such as dirt and calcium sulphate; the calcium sulphate being the principal impurity. According to prior refining procedures, such "impure" salts have been "refined" in some instances by treatment of saline solutions obtained directly from wells, or from water-solutions produced by dissolving previously mined or otherwise produced impure salt substances in water or other suitable solvents. Then, purified salts have been extracted from such solutions by the use of vacuum evaporator systems, using either single evaporator units or series thereof; the series type systems being generally used by reason of better economy. In such systems the heat required for evaporating the solvents from the brine solution is usually supplied by out-of-contact condensation of steam, using heat transfer surfaces of various types in the evaporators.

In systems of the type above referred to the salt produced is in the form of small cubical crystals, and this form of salt is commercially is great demand. Another type of "refined" salt; namely, so-called grainer salt, is produced by evaporation of the water from brine in open pans. In this case the evaporation of the brine may be assisted by use of heat exchange surfaces arranged to heat the brine in the pans. Salt crystals produced in this manner are of the "flake" form, and have certain special commercial applications.

In accordance with the aforesaid patents, in order to produce a "purified" salt, advantage is taken of the phenomenon known as the "inverse solubility" of calcium sulphate in relation to sodium chloride. The calcium sulphate content of the crude salt which is fed into the system will remain substantially undissolved under certain conditions, and can be removed by filtration or other known methods of separation. In carrying out the system, impure salt is first dissolved in a brine "saturating zone" wherein the temperature and pressure are maintained substantially greater than in the "evaporation" zone. Then when the brine is delivered into the evaporation zone a drop in temperature takes place, with the result that the brine becomes or remains undersaturated with respect to the calcium sulphate even though the concentration of the sodium chloride becomes substantially increased. Or, alternatively, the purer sodium chloride may be precipitated out of the solution at this stage, in accordance with the preferred practice. In such case any undissolved material, whether dirt or calcium sulphate, is separated from the brine before the brine is taken into the evaporation or crystallizing zone, with the result that the sodium chloride becomes separated from such impurities; and, if desired, it can then be precipitated out so as to provide a product of high purity. According to such systems sodium chloride of purities in excess of 99.98% can be produced directly from a source of relatively impure salt such as dirty rock salt.

More specifically, in the treatment of sodium chloride salt in accordance with the systems as aforesaid, brine solutions containing dissolved sodium chloride are heated by condensation of vapor in direct contact with the brine solutions, and with the attendant addition thereto of the condensate resulting from condensation of the vapor. Impure solid salt is dissolved in the so-heated and diluted brine solution to produce a more concentrated solution which preferably is substantially completely saturated with respect to sodium chloride at the temperature to which the brine solution has been heated. Since the brine solution has become concentrated by dissolving the salt therein, the pressure (as well as the temperature) is maintained such that at this step in the operation the salt remains dissolved in the brine under the prevailing conditions of temperature and pressure. During the saturation step all or part of the calcium sulphate contained in the impure material tends to remain undissolved, to a degree depending on the extent to which the brine that is introduced into the saturating zone in the system is already saturated with calcium sulphate. Moreover, any dirt existent in the feed material remains undissolved.

The concentrated brine is then separated from the undissolved material and is introduced into an evaporation zone which is maintained under such pressure that the clarified brine solution boils at a temperature substantially lower than that of the brine solution during the dissolution of the salt therein. Due to the reduction both in temperature and pressure, as well as the separation and removal of vapor, the proportion of sodium chloride in relation to solution saturation is materially increased; and in accordance with the preferred practice of such systems there is a simultaneous production of high purity crystallized salt. The residual salt-containing brine is then removed from the evaporating zone to a separating zone wherein salt is removed, leaving residual brine. Salt may be removed from the brine by physical removal of purified crystallized salt or by electrochemical decomposition of the salt and removal of the products of the electrochemical decomposition. Brine from which salt has been removed may then be returned to the initial stage of the system wherein the brine is heated by condensation of vapor in direct contact therewith. It is thus seen that such operations are preferrably performed continuously.

However, it is a specific object of the present invention to provide an improved combination salt mining and purifying method and means, employing only some of the prior art practices referred to above; whereby certain operating advantages accrue in respect to the mining phase as well as in respect to the product benefication phase of the overall operation.

Another object of the present invention is to provide an improved system as aforesaid which eliminates need for certain intermediate material transport operations, thereby effecting substantial overall economies.

Another object is to provide an improved system as aforesaid which reduces or eliminates the need for external heat supplies, and which also greatly reduces the processing apparati required, compared to prior art systems.

Another object is to provide an improved system as aforesaid wherein a deposit of rock salt or the like is economically utilized simultaneously as the operational heat source and as the mineral source for production of a purified salt product.

Another object is to provide an improved system as aforesaid effecting great economies in the overall costs of operation.

Other objects and advantages of the invention will be apparent from the following specification and the accompanying drawing wherein:

FIG. 1 is a phantom-like vertical sectional view, showing a geological formation including a typical salt "dome" in process of being mined concomitant with benefication of the mined product in accordance with the present invention.

FIG. 2 is an enlarged scale diagrammatic illustration of the surface-plant equipment of FIG. 1; and FIG. 3 is a diagrammatic illustration of another form of surface-plant such as may in some cases be employed in conjunction with the system of the invention.

As shown by way of example herein, the invention is embodied in a system for simultaneously mining and "purifying" sodium chloride salt occurring in an underground deposit of the well known "salt dome" type; but it is to be understood that the invention may be usefully applied to other forms of soluble mineral deposits, such as sodium borate, potash, and the like. However, it is a feature of the invention that the system thereof is particularly adapted for use in connection with mineral deposits occurring at relatively great depths below the earth surface, employing as an incident thereto the ever-available heat supply inherently existent at deep levels underground. For example, it is now known that in the Louisiana region commercially important "domes" of salt typically occur as illustrated at FIG. 1 of the drawing herewith; such domes measuring as much as a mile in diameter and extending downwardly to as yet unknown distances, although it is well established that such domes do extend for as much as three to four miles in depth. Furthermore, it is known that underground temperatures invariably increase with depth, and that in the salt domes referred to temperatures of the order of 240 degrees F. have been recorded at depths of the order of 8,000 feet.

It is of course well known that "solution mining" methods are quite practical, and that sodium chloride salt may be taken into solution in situ by circulating water therethrough as by means of underground coalesced boreholes carrying solvent to and brine away from the deposit for subsequent evaporation into solid salt form. The boreholes may be interconnected by any suitable method, such as by fracturing, trumping, drilling, solution channelling; or the like. The present invention takes advantage of the fact that deposits of salt such as illustrated herein are at such depths that the earth temperatures ambient to a borehole leading downwardly from the surface and penetrating such a deposit are of high order, and may effectively satisfy the heat source requirements for a coincident beneficiation operation when employing apparatus of the present invention. Hence, the expense of externally supplied heat is avoided, and also by virtue of this feature of the invention the "surface plant" equipment requirements are reduced, whereby further substantial economies are also effected.

By way of more specific explanation of the invention, as shown herein by way of example a salt dome or other deposit is intersected by a pair of vertical boreholes as indicated generally at 12–14 respectively. To "complete" the boreholes and to prevent compression failures of the walls thereof, they will of course be preferably "cased" as is well known in the art. Note that the borehole 14 may preferably be fitted with a casing system of the concentric triple casing type, for purposes to be explained more fully hereinafter. In any case the boreholes are drilled into the salt deposit so that at their nether or lower ends they penetrate into the deposit at some distance apart from one another, say of the order of 200 feet or so. Then, to provide for liquid circulation through the system the salt bed between the boreholes is fractured or channeled by some suitable method. For example, as shown in FIG. 1 of the drawing herewith, either one of the boreholes may be angularly deflected away from parallelism with the other borehole as shown at 16 (FIG. 1) so as to intercept the other borehole as it approaches its prescribed depth. Techniques for this purpose are well known, and means therefor are shown for example in U.S. Pat. 3,174,549. Or, in lieu thereof the boreholes may be driven straight vertically and parallel, and later "channeled" together by means of a "fracturing" operation, such as disclosed in U.S. Patent 3,064,957. Thus, in any case the boreholes provided are in fluid-flow communicating relation adjacent their nether or lower ends, thereby providing a system wherein solvent may be pumped down one of the boreholes and brine delivered upwardly through the other to the surface plant. As is well known in the art, a dissolution cavity as illustrated for example in FIG. 1 will thereupon form in the salt deposit, from which saturated brine may be continuously pumped to the surface plant which is indicated generally at 18 (FIGS. 1, 2).

It is a particular feature of the present invention that the system thereof employs the vast heat supplies existent at substantial depths in the earth's crust, not only to effect the requisite vaporization and/or brine-evaporation phases of the salt product beneficiation operation; but in addition to heat the solvent (comprising the residual brine effluent from the evaporation operation plus make-up fresh solvent added if and when needed) as it is injected through the casing 12 into the dissolution cavity, thereby causing it to be delivered into the cavity in undersaturated condition. By circulating this undersaturated solvent mixture into the dissolution cavity and from thence back to the surface and through the salt recovery facility, under the specifically controlled conditions of the present invention as will be explained hereinafter, the salt deposit per se provides at the same time the source of raw mineral and the source of heat which is also required in connection with the purification process. When the system is installed and operated within the specific parameters of the invention the heat so derived will be so conserved and utilized as to render the system in every way practicable; the abstraction of heat from the salt deposit being automatically compensated by continuous heat conduction replacements from the ambient geology.

Whereas the brine delivery or "production well" casing portion of the system is shown herein by way of example to be of the triple casing type including concentrically arranged tubes 20, 22, 24, the system may be of any other preferred form. In any case, a primary (inner) conduit or tube 20 is provided to convey the brine in heat-insulated form upwardly to the point of discharge of the brine into the evaporator portion of the brine treating apparatus. Thus, the heated saturated brine derived from the dissolution cavity will be maintained under maximum pressure and temperature conditions until delivery to the "evaporator," thereby preventing premature crystallization of solids in the conduit system.

Any suitable means may be employed for insulating the brine upflow conduit 20 such as by covering it with heat insulation material, or by enclosing it within a larger conduit 22 and filling the annular space therebetween with some suitable heat insulating substance; dead air; vacuum or the like. Or, as shown in the drawing herewith at FIGS. 1, 2, when the purification system is of the closed-circuit type the hot vapors from the evaporator apparatus may be advantageously employed by pumping them down inside the conduit 22 in heat-exchange relation with the brine upflow conduit 20, as shown in better detail in FIG. 2. Also, as shown in FIG. 2, if the vapor heating system for the brine upflow conduit is employed it may be desirable to provide a pressure relief means for the underground system, and this may be readily arranged by providing the third casing 24 as shown in FIG. 2. Note that the upper end of the vent casing 24 is open to the atmosphere. In such cases the two outermost casings 22, 24, will preferably be closed at their lower ends (but in fluid flow intercommunication thereat) while the innermost or central casing 20 will be open at its bottom end and in communication with the solution cavity.

It is to be understood that the system of the invention may employ any preferred form of salt purifying apparatus. For example, as shown in FIG. 2 herewith it may be of a relatively simple, single stage, "evaporator" type wherein the heated saturated brine is discharged into an evaporator (as disclosed for example in U.S. Patents 2,555,340 and 2,876,182) wherein the brine is subjected to pressure and temperature drop conditions permitting pure solid salt to separate out from the brine. However it is to be understood that in lieu of the simple, basic form of refining system shown in FIG. 2 herewith, any other preferred multi-stage and/or more sophisticated refinery system (such as disclosed in the aforesaid patents) may be employed.

In any case, the effluent residual brine from the refining facility, which is being pumped back down the borehole 12, will be sodium chloride saturated at its injection temperature (except perhaps whenever evaporation losses require the addition of "make-up" solvent which may be furnished at somewhat lower temperature). However, as explained hereinabove, as this brine travels downwardly through the uninsulated casing 12 in heat-exchange relation therewith, it becomes heated, such as by example from an injection temperature of the order of say 90° F. up to a temperature of the order of 220° F. as it traverses the dissolution cavity; assuming the cavity ambient rock temperature to be of the order of 240° F. Because the brine upflow conduit 20 is of heat-insulated form as explained hereinabove, when the superheated (and therefore supersaturated) brine or solution reaches the evaporator apparatus it may well be of a temperature in the order of 215° F.; assuming a reasonable efficiency factor for the heat insulating means. The resistance to fluid flow offered by the extended casing structures will of course insure that the dissolution product is also maintained under high pressure until it is discharged into the evaporator apparatus. Hence, it will be appreciated that the operative characteristics of the heat-saturator phase of the system of the invention bring it well within the realm of feasibility for realization of the objects of the invention as set forth hereinabove.

However, it is still another technological feature and economic advantage of the present invention that by virtue of the relative positional arrangements and operative relationships of the essential components of the system, there may be no longer a need for any externally derived heat supply, but also there is no essential need for certain accessory devices such as are called for by prior art systems. This feature of the invention derives from the fact that insoluble impurities resident in the deposit being mined automatically settle out of the brine when released by dissolution of the cavity wall material, and fall into and remain in the bottom of the cavity, and therefore do not carry up into the refining apparatus. Hence, the need for filtering equipment is minimized, and the need for saturators, condensers, heaters and the like in connection with the surface plant is completely eliminated.

Also, because in the case of the present invention the insoluble impurities occurring in the mineral deposit are not brought to the surface, there is no problem at the surface plant with respect to disposal of wastes, such as might in turn create problems concerning nearby watershed pollution, or the like.

It is also particularly noteworthy that in the case of the present invention the phenomenon known as the "inverse solubility ratios" of sodium chloride and calcium sulphate (the major impurity ingredient of native rock salt) operates within the dissolution cavity of the system. Otherwise stated, because the solvent liquid in the cavity is maintained at high temperature it automatically retards dissolution of calcium sulphate into the brine. Therefore large percentages of this material when released in situ from the salt deposit will simply settle down into the bottom of the dissolution cavity, thereby reducing the impurity separation load on the surface plant. In fact, by virtue of this feature of the invention the surface refining plant requirements may well be so reduced that a rudimentary form of solid salt recovery apparatus may be satisfactorily employed at the surface, such as shown as example at FIG. 3. In this case the brine uplift conduit 20 is arranged to simply spray the superheated saturated brine into an open vat or pan, whereupon the accompanying release of pressure and drop of temperature will result in vaporization of some of the water content and settling out of solid salt. The salt carrying brine will then pass over into a cooling vat or pan wherein the pure salt of various types and sizes will recrystallize and settle out at various stations therein for recovery as by means of rake devices or the like as shown at 30. Similar devices as indicated at 32 or the like will of course be employed to remove the solid salt products from the evaporator vat, as they accumulate therein.

Another feature attendant the mining systems of the present invention is that sodium chloride or similar "rock salt" deposits of the deep-seated dome type are under such great and constant pressure and temperature conditions that any cavities formed therein continuously tend to close in upon themselves. For example, it has been determined that a column of ordinary rock salt will plastically flow and compress to 50% of its original height in 100 hours at 212° F. when subjected to a pressure load of 6,000 lbs. per square inch. Thus, assuming initial formation of a dissolution cavity at a depth of say 8,000 feet, the form of such a cavity immediately induces stress concentrations in the wall material in excess of normal load forces, thereby insuring continuous plastic flow of solute to the situs of the dissolution action.

It will, of course, be appreciated that whereas only a few forms of suitable equipment and operating specifications have been illustrated and/or discussed by way of example herein, various changes may be made therein without departing from the spirit of the invention or the scope of the following claims.

We claim:
1. The method of concomitantly mining and beneficiating a deposit of soluble mineral disposed at such depth beneath the earth's surface as to be surrounded by a geological environment characterized by being at a substantially elevated temperature relative to the neighborhood earth surface rock temperature, said method comprising,
   drilling first and second bore holes downwardly from the earth's surface into said deposit,
   completing said boreholes by installation of means preventing wall failure closures of said boreholes and by installation of wall heat insulation means substantially throughout the length of said second borehole from the upper end thereof to at least adjacent the nether end thereof,
   establishing fluid-flow communication between the nether ends of said bore holes through said deposit,
   pumping a solvent for said mineral downwardly through said first bore hole in direct heat exchange relation with the borehole wall and in indirect heat-exchange relation with the ambient geology thereby heating said solvent to a substantially elevated tem- perature and then circulating said heated solvent through said deposit and up through said heat-insulated second borehole while maintaining substantially constant temperature and pressure conditions on the upflowing dissolution product, and then discharging said product into recovery apparatus providing a reduced temperature and pressure atmosphere for separation of purified mineral from the remainder of said product.

2. The method as set forth in claim 1 wherein said mineral deposit comprises a sought-for ingredient having insolubility characteristics varying in direct relation to temperature changes and impurity ingredients of inverse relation solubility characteristics, whereby the heated solvent passing through said deposit produces a dissolution product having an improved ratio of pure vs. impure ingredients for discharge into said recovery apparatus.

3. The method as set forth in claim 1 wherein said sought-for mineral ingredient is of crystalline form and whereby when said purified mineral separates from said dissolution product it precipitates in recrystallized form.

4. A method as set forth in claim 1 wherein said recovery apparatus comprises a series of evaporator devices, the liquid effluent from each lead evaporator device comprising the feed input to the next succeeding evaporator device and the liquid effluent from the last evaporator being delivered to the solvent make-up system for recirculation through the borehole and dissolution cavity and recovery apparatus system in closed circuit manner.

5. A method as set forth in claim 1 wherein the hot vapor effluent of the recovery apparatus is pumped back down said second borehole in heat exchange relation with the dissolution product rising through said second borehole.

6. The method as set forth in claim 1 wherein the effluent from said recovery apparatus is fed to said solvent pumping operation thereby comprising a portion of the make-up of said solvent.

7. The method as set forth in claim 4 wherein said solvent includes a relatively lower temperature fresh water make-up ingredient.

8. The method of solution mining a deposit of soluble mineral characterized by its increasing solubility with increasing solvent temperature which comprises, forming first and second passages extending from the earth's surface into said deposit to depths therein at which (a) the ambient temperature of the deposit in excess of the boiling point of the solvent at a predetermined pressure not greater than atmospheric pressure and (b) the hydrostatic head on the solvent is many times greater than atmospheric pressure, locating the nether ends of said passages in spaced relation to each other, and forming a solvent flow channel between said nether ends of the passages, introducing solvent into the upper end of said first passage at a pressure exceeding that of the hydrostatic head on the solvent to cause solvent to flow through said first passage, through said channel to and upwardly through said second passage, and at a flow rate to allow the solvent to be heated substantially to the aforesaid ambient temperature of the deposit and to become saturated with the deposit material at such temperature and pressure, maintaining the solvent substantially at the stated temperature and pressure as it passes up the second passage to the earth's surface, reducing the pressure on the solvent emanating from the second passage at the earth's surface to said predetermined pressure and cooling such solvent and removing solid deposit material therefrom formed in response to the temperature and pressure drop, and using the cooled, depressurized solvent as the introduction solvent as aforesaid.

References Cited

UNITED STATES PATENTS

| Re. 25,682 | 11/1964 | Jacoby | 299—4 |
| 1,121,225 | 12/1914 | Bradley | 299—5 |
| 3,241,611 | 3/1966 | Dougan | 166—11 X |

ERNEST R. PURSER, *Primary Examiner.*

UNITED STATES PATENT OFFICE
CERTIFICATE OF CORRECTION

Patent No. 3,348,883    October 24, 1967

Charles H. Jacoby et al.

It is hereby certified that error appears in the above numbered patent requiring correction and that the said Letters Patent should read as corrected below.

Column 1, line 52, for "is", second occurrence, read -- in --; column 7, line 39, for the claim reference numeral "4" read -- 6 --.

Signed and sealed this 5th day of November 1968.

(SEAL)
Attest:

Edward M. Fletcher, Jr.
Attesting Officer

EDWARD J. BRENNER
Commissioner of Patents